United States Patent Office 3,560,078
Patented Feb. 2, 1971

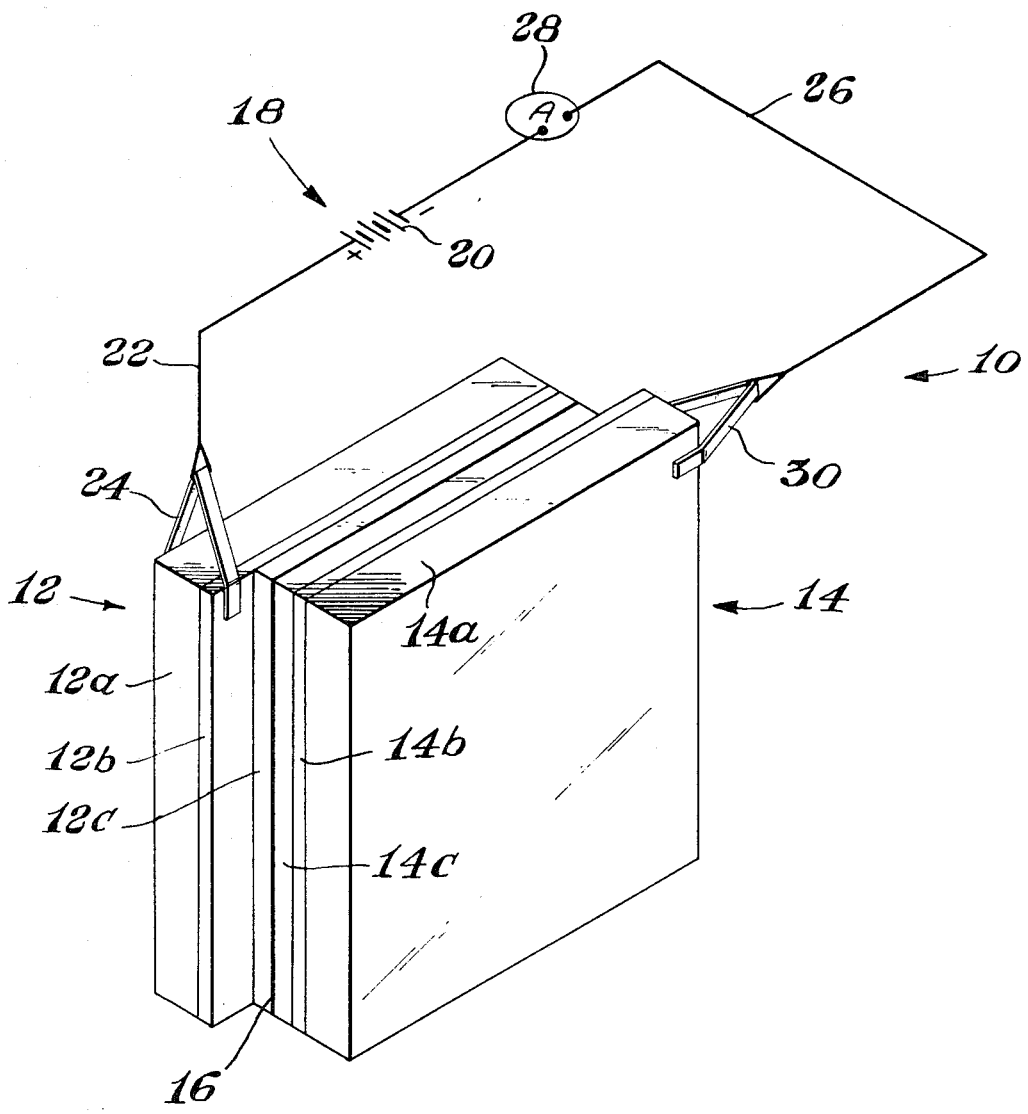

3,560,078
COLOR REVERSIBLE LIGHT FILTER UTILIZING SOLID STATE ELECTROCHROMIC SUBSTANCES
James A. McIntyre and Robert D. Hansen, Midland, Mich., assignors to The Dow Chemical Company, Midland, Mich., a corporation of Delaware
Filed July 1, 1968, Ser. No. 741,637
Int. Cl. G02f 1/28
U.S. Cl. 350—160          4 Claims

ABSTRACT OF THE DISCLOSURE

The invention provides a color reversible light filter system utilizing solid state films of inorganic compounds having electrochromic properties in a multi-layer glass panel. The glass panel consists of two panes of substantially transparent glass, with one pane being coated with a layer of tin oxide, and a film of silver chloride containing free silver, to provide a colorless electrode; the opposite pane being coated with a layer of tin oxide and a film of tungstic acid, or preferably a mixture of tungstic and molybdic acid, to provide a color-reversible electrode. A stable color is developed in the glass panel by applying a DC electrical potential across the electrodes for only a few minutes and, when desired, the panel can be rendered colorless in about the same length of time by reversing the polarity of the electrodes.

BACKGROUND OF THE INVENTION

(A) Field of the invention

This invention relates generally to a light filter system. More specifically, the invention concerns a color-reversible light filter system comprising basically a glass panel containing a set of electrodes having electrochromic portions in the form of solid state films of certain inorganic compounds, the electrodes being capable of developing a color in the panel upon applying an electrical potential thereto and of fading to a colorless condition upon reversing the polarity of the electrodes.

(B) History of the prior art

The prior light filtering systems may be generally classified into three groups, namely, electrolytic, thermochromic and photochromic systems, as determined by the methods employed to effect the desired color change in the filter. Representative of the electrolytic systems are those disclosed in U.S. Pats. 3,282,157 to 3,282,160 inclusive, and 3,283,656 to Jones et al. The electrolytic filter systems disclosed in the foregoing patents generally involve sealing aqueous solutions of various metal ion complexes between a set of electrodes and sequentially applying pulses of electrical power of opposite polarity across the electrodes to alter the color of the solution. Such systems have various disadvantages. For example, in addition to being somewhat bulky, the filter must be tightly sealed to prevent evaporation or leakage of the liquid electrolyte. Further, an antifreeze compound must be added to the electrolyte to prevent freezing when the filter is subjected to outside weather conditions.

Another type of electrolytic filter system is commercially available under the trade name Varad Panel (Research Frontiers, Inc., Farmingdale, N.Y.). In such a system the filter is a suspension of sub-microscopic needle-like solid particles in a transparent dielectric liquid, as contained between a pair of electrodes comprising transparent glass plates having electrically conductive coatings thereon. In "closed" condition the panel is opaque due to random orientation of the needle-like particles, but by applying an AC voltage to the electrodes the resulting electric field aligns the suspended particles to admit visible light through the panel and thus render it transparent or in "open" condition. A chief disadvantage in such a filter system is that a relatively high percentage of the needle-like particles will not be aligned by the electric field, i.e. they will remain randomly oriented during "open" condition of the panel. Such a condition obviously limits the range of the opacity of the panel. Additionally, the use of a liquid electrolyte in the Varad Panel would seem to prevent some of the same disadvantages inherent in the liquid electrolyte systems described hereinabove. Another drawback of this system is found in the instability of the suspended particles, which are known to turn color after a period of use, presumably as a result of electrolysis or photochemical reaction in the suspension.

A typical thermochromic system, as taught in U.S. Pat. 2,710,274, involves use of a layer or film of a material sandwiched between transparent glass layers wherein the film material is capable of reversibly varying the transparency of the multi-layer glass sheet with changes in temperature and/or luminous intensity. An apparent disadvantage of such systems is a lack of positive control of the light transmission, that is, the color change is strictly dependent on the amount of light absorbed by the film material, the light being converted to heat energy to provide the desired color reaction.

A prior photochromic system is disclosed in U.S. Pat. 2,953,454 in which the filter comprises a base sheet, such as paper, coated with a color-reversible light-reactant organic compound. In such a system color is developed in the filter by applying electromagnetic radiation (light) of a certain wavelength, the reaction being reversible so that the color can be erased when desired by applying a different wave band of the electromagnetic radiation. Generally speaking, such systems can be difficult to control under certain conditions. For example, if the filter is employed in an outside environment, in which the color development is strictly dependent on natural light, such as sunlight, an elaborate and complex shutter system would be required to control the amount of light striking the filter.

SUMMARY OF THE INVENTION

It is a principal object of the present invention to provide a simple and compact color reversible light filter system wherein the filter comprises solid state films of inorganic compounds having electrochromic properties.

A more specific object of the invention is to provide light filters which would have potential utility in a variety of applications, such as glare-reducing windshields for vehicles, as panes for windows, doors and sky-lights in buildings, and as memory-retaining devices for high density storage of data in computers and the like.

A further object of the invention is to provide a color reversible light filter which may be readily controlled to effect substantially rapid color development and fading and to maintain a stable color formation for an indefinite period of time.

Other objects and advantages of the invention will be apparent from references to the following description taken in conjunction with the accompanying drawing.

A color-reversible light filter system according to the practice of this invention consists essentially of a multi-layer transparent panel which incorporates therein a set of electrodes designated as a colorless electrode and a color-reversible electrode. The electrodes comprise opposing panes of a substantially transparent material, such as glass, a suitable plastic or the like, each pane being coated with a layer of tin oxide, as an electroconductive portion, and a solid film of an inorganic compound, as an electrochromic portion. It will be appreciated that the electroconductive and electrochromic portions of the electrodes are applied as extremely thin layers of materials so as to maintain the transparency of the filter panel. A stable, light filtering color can be developed in the panel in a relatively short time by application of a direct current potential across the electrodes and, conversely, the color can be readily removed by reversing the polarity of the electrodes. A significant feature of this invention is that the foregoing procedure may be repeated an indefinite number of times to provide a long operating life for the panel.

BRIEF DESCRIPTION OF THE DRAWING

The figure is a view, partly in perspective and partly in schematic, of a multi-layer glass panel incorporating a color-reversible light filter with an appropriate power system associated therewith according to a preferred embodiment of the invention.

The drawing illustrates only one of numerous embodiments within the scope of this invention and the form shown is selected for convenient illustration and clear demonstration of the principles involved.

DESCRIPTION OF A PREFERRED EMBODIMENT

With reference to the drawing, there is illustrated a multi-layer glass panel incorporating a color-reversible light filter system therein, as indicated generally by the numeral 10. The filter panel 10 consists basically of two opposing electrode means, designated as a colorless electrode means 12 and a color-reversible electrode means 14. Colorless electrode means 12 comprises a substantially transparent glass pane 12a, the surface of which is coated with a thin layer of tin oxide to define an electroconductive portion 12b, to which is bonded a thin film of silver chloride containing free silver, to define a colorless portion 12c. The color-reversible electrode means 14 comprises a transparent glass pane 14a, coated with a thin layer of tin oxide to define an electroconductive portion 14b and a thin film of a tungstic-molybdic acid mixture, which defines an electrochromic color-reversible portion 14c. It will be understood that the thickness of the tin oxide, the silver-silver chloride and the tungstic-molybdic acid layers which comprise portions 12b, 12c, 14b and 14c of the electrodes are limited only by the degree of transparency desired in the filter panel and the conductivity of the layer. For use as a light filter, of course, extremely thin films are preferred. In instances where higher optical densities are desired, layers several millimeters in thickness would be operable.

In assembling filter panel 10 the exposed flat surface of colorless portion 12c of electrode 12 is set flush against the color-reversible portion 14c of electrode 14, such that the mating surfaces of portions 12c and 14c thereby define a common seam or face 16. Once the electrodes 12 and 14 are assembled in operating relation, to constitute the complete filter panel 10, the panel is held together by any suitable clamping means (not shown). Numeral 18 refers generally to an appropriate power system for applying a direct current potential across the electrodes to obtain the desired color development. The color developed in the filter panel will depend, of course, on the composition of the electrochromic materials which make up the respective electrodes. With the preferred tungstic-molybdic acid system utilized in the present invention, a distinct blue color will develop in the filter panel upon applying a direct current to the electrodes. In the preferred embodiment of filter panel 10, as illustrated herein, a conventional wet cell battery 20 (10 volt) provides a convenient source of DC power, it being understood that any suitable source of supplying DC power to the electrodes may be used in the practice of the invention. In a preferred form of the power system 18 the colorless electrode means 12 is connected to battery 20 through lead 22, which connects at one end to the positive terminal of battery 20 and at the other end to an "alligator" clamp 24 attached to electrode 12. A circuit to the color-reversible electrode means 14 is completed through a lead 26, which connects at one end to the negative terminal of battery 20, passes through an ammeter 28, and connects to an "alligator" clamp 30 attached to electrode 14.

In the present filter panel the transparent panes of the electrode means may be constructed of glass, suitable plastics or any other substantially transparent material. The electroconductive portion of each electrode means is provided by a thin coating of tin oxide on the panes. The tin oxide coating should be of sufficient thickness to provide the necessary electroconductivity for the glass pane, but at the same time it should be thin enough so that the coated pane remains transparent. For convenience and best results it is preferred to use existing commercially available tin oxide coated glass panes.

For the electrochromic portion of the colorless electrode it is preferred to use a solid state film of silver chloride (AgCl) containing a trace amount of free silver (Ag). To apply the Ag-AgCl film to the transparent tin-oxide coated glass it is preferred to employ a standard vacuum deposition technique in which the glass to be coated is placed in a chamber which can be evacuated and a filament, containing a charge of Ag or AgCl, located below the glass which can be heated to deposit the film thereon. Once the system is evacuated current is passed through it and the Ag or AgCl evaporates and condenses out on the cold glass as a solid transparent film. One technique is a two-step procedure wherein a very thin layer of Ag is first deposited on the glass, which is followed by a second step in which a layer of AgCl is deposited over the Ag layer. A more convenient and simpler method, however, is to deposit the Ag-AgCl film on the glass in one step by utilizing a commercially available grade of AgCl.

As the electrochromic portion of the color-reversible electrode, the preferred solid state film is a mixture of about 15% tungstic acid and 85% molybdic acid. The composition of the film is not limited to this precise mixture, however. In the practice of this invention we have found, for example, that a solid state film containing a mixture of about 50% tungstic acid and 50% molybdic acid, or a film comprising approximately 100% tungstic acid will function equally well as a color-reversible electrode. It is contemplated that other compounds having the desired electrochromic properties to provide suitable color-reversible electrodes according to this invention would include acids of various inorganic metals such as niobium, tantalum, titanium and the like.

An operable tungstic-acid compound which can be employed as the electrochromic portion of the color-reversible electrode in the light filter panel of this invention comprises a powder of substantially uniform submicron particles preferably prepared in the following manner:

A 6% by weight aqueous solution of sodium tungstate dihydrate ($Na_2WO_4 \cdot 2H_2O$) was passed into a sulfonic acid ion exchange resin column (Dowex 50WX-4, 50/100 mesh, $NH_4^+$ form) until the $Na^+$ breaks through. The effluent from the column was slurried with a similar acid ion exchange resin ($H^+$ form) for a few minutes; the slurry was filtered to remove the resin and the resulting tungstic acid filtrate was charged to a glass or polyethylene pot. The filtrate was heated for a few hours to induce incipient boiling and the solid product was separated and recovered by spray drying or flocculating, followed by filtering or centrifuging.

The tungstic-molybdic acid mixture employed as the electrochromic portion of the color-reversible electrode in the preferred embodiment of this invention is preferably prepared in a manner similar to that of the tungstic acid. The procedure was generally as follows:

As the starting material, an aqueous solution of sodium tungstate-sodium molybdate dihydrate was prepared by adding 171 g. of $Na_2WO_4 \cdot 2H_2O$ and 1362 g. of $Na_2MoO_4 \cdot 2H_2O$ to 13 liters of water. The solution was passed through a sulfonic acid ion exchange resin column (containing about 24 equiv. of Dowex 50WX–4, 50/100 mesh, $NH_4^+$ form). Both the effluent solution and the solution obtained from rinsing the column were collected and the collected solution was stirred for about 15 minutes with about 11.4 equiv. of Dowex 50WX–4, 50/100 mesh $H^+$ form resin. The solution was filtered to remove the resin and the filtrate was heated at between about 95–100° C. for about 3 hours, during which time the tungstic-molybdic acid mixture formed a sol. The sol was filtered and the resulting cake dried to give the final product as discrete, submicron particles of a generally cylindrical shape (dia. about 0.5–1.0 micron and length about 2–20 microns).

In a preferred method for preparing the color-reversible electrode, the tungstic-molybdic acid mixture is made up as a sol (colloidal solution), e.g. about a 25 ml. solution, which is charged to a conventional spray gun. A very fine spray of the solution is then directed onto the exposed surface of a tin-oxide coated transparent glass pane, the pane being heated during application with an infra red lamp, a hot plate or other suitable means to dry the solution thereon as a thin, solid film.

An alternative method for preparing the color-reversible electrode is to charge a small quantity of the tungstic-molybdic acid sol to a beaker or other suitable container. The tin-oxide coated glass pane is positively charged by applying a DC potential of about 1.5 volts thereto and the electrically charged pane is dipped into the sol where it is retained for about 20 minutes. During this period the tungstic-molybdic acid particles, which carry a negative charge, will deposit or "plate out" as a thin, transparent, distortion-free film on the surface of the positively-charged glass pane.

To obtain the desired development and fading of color in the filter panel, the DC potential applied across the electrodes should be sufficient to effect a decomposition. i.e. a reversible reduction-oxidation between the tungstic-molybdic acid film of the color-reversible electrode and the silver-silver chloride film of the colorless electrode. In the practice of this invention a potential of from about 3 to 10 volts and a current of from about 1 to 50 milliamps (ma.) has been found satisfactory. Those skilled in the art will appreciate, however, that the invention is not limited to these precise ranges. Establishing an operable DC potential depends on several factors, such as, for example, the electrochromic properties of the solid state materials comprising the electrodes, the size of the electrodes themselves, and the desired rate of color formation. A stable, non-fading color can be developed in the filter panel by applying the DC potential across the electrodes for from about 0.5 to 3 minutes. Conversely, the color can be readily erased by reversing the polarity of the electrodes and again applying the DC potential for from about 0.5 to 5 minutes. A particular advantage of the present filter system over some of the prior systems is the stability of the color. In the present system, for example, once the desired color is developed in the filter panel, the current may be shut off and the color will retain its original intensity for an indefinite length of time without further application of current.

Although the basic electrochromic reaction which takes place in the light filter system of this invention, to provide the desired color development and fading therein, is rather complex and not completely understood, the following is a brief explanation of what is believed to be the general mechanism of the reaction. It will be understood that we do not intend to be bound by this explanation, but rather it is presented as merely one possible mechanism of the operation of the present filter system.

When the electrochromic portion of the color-reversible electrode, i.e. the tungstic or tungstic-molybdic acid film, is in a colorless condition, the oxidation state of the metal in the electrode is plus (+) 6. By connecting the electrode to the negative terminal of the battery and applying a DC potential thereto some of the metal ions are reduced to a plus (+) 5 state. The positive side of the circuit, on the other hand, is the colorless electrode having an Ag-AgCl film as an electrochromic portion, in which some of the free silver atoms will oxidize to a plus (+) 1 state upon applying the DC potential thereto. In this situation the "acid" electrode (tungstic-molybdic) contains a metal in two oxidation states, namely, plus (+) 5 and plus (+) 6, and there exists the possibility of what may be referred to as a metal to metal charge transfer [see Phillips and Williams, "Inorganic Chemistry," vol. 2, Oxford, pp. 405–406 [(1966)]. Without going into further detail, those skilled in the art will recognize that in such a situation an electron can very readily transfer from an ion in a plus (+) 5 oxidation state to one in a plus (+) 6 oxidation state under the influence of light of an appropriate wavelength. It is this very phenomena, therefore, by which the present filter absorbs a characteristic wavelength of light which gives rise to the blue color therein.

The only reaction which occurs in the colorless electrode, as mentioned above, is the oxidation of the free Ag ion ($Ag \rightarrow Ag^+ + e^-$). It has been shown, for example, by Tubont et al., Z. Anorg. Allgem. Chem., 110 196 (1920), that the $Ag^+$ ion carries all of the current in solid silver halides. Further, from experiments conducted in the practice of this invention, it has been observed that the $Ag^+$ ion will transport into the "acid" layer of the color-reversible electrode under the influence of the DC potential. From this observation it is believed that the presence of the $Ag^+$ ion in the "acid" layer enhances stabilization of the material when in its colored (blue) state. By reversing the polarity of the electrodes, of course, the opposite reaction will occur, i.e. the metal ions in the "acid" layer will oxidize to a plus (+) 6 state (colorless) and the $Ag^+$ ions will reduce back to Ag atoms.

From the foregoing explanation it will be apparent that both the tungstic-molybdic (color-reversible) electrode and the Ag-AgCl (colorless) electrode are required in the light filter system of this invention. In other words, for electrolysis to occur, there must be a simultaneous oxidation at the anode and a reduction at the cathode. Unless both reactions are possible no current will pass through the system and, consequently, no color will develop therein.

The following example is given to more clearly illustrate the practice of this invention, it being understood that the invention is not limited to the procedure described herein.

EXAMPLE

A filter panel, as illustrated and described herein, was prepared by utilizing two 1″ x 3″ panes of commercially available tin oxide coated glass. Following the general procedure described hereinbefore a thin film of Ag-AgCl was applied to one tin oxide coated pane to provide the colorless electrode and to the other pane was applied a thin film of tungstic-molybdic acid to provide the color-reversible electrode. The panes were assembled such that the surfaces of the Ag-AgCl portion of the colorless electrode and the tungstic-molybdic portion of the color reversible electrode were flush against each other and the assembled panel was held together with a suitable clamping means, such as a standard C-clamp. A power system providing a source of direct current for the filted panel was obtained by connecting the colorless electrode to the positive terminal of a standard 10 volt wet cell battery, whereas the color-reversible electrode was connected through an ammeter to the negative terminal of the battery.

Before applying current to the electrodes of the filter panel the entire panel was substantially colorless and transparent. Upon applying a potential of about 3 volts across the electrodes for a period of about 3 minutes, however, the electrochromic portion of the color-reversible electrode (film comprising 15% $H_2WO_4$–85% $H_2MoO_4$) was observed to develop a distinct dark blue color, while the electrochromic portion of the colorless electrode (film comprising Ag-AgCl) remained in its original colorless state. The power system was then detached from the filter panel and the panel was allowed to stand for a period of about seven (7) days to ascertain the effectiveness of the $H_2WO_4$-$H_2MoO_4$ system to retain the color developed therein. After the panel had stood for about seven (7) days with no current flowing therethrough, no diminishing of the blue color therein could be detected by visual observation. The polarity of the electrodes was then reversed by connecting the colorless electrode to the negative terminal of the battery and, in turn, connecting the color-reversible electrode to the positive terminal thereof. After again applying a potential of about 3 volts across the electrodes for about 5 minutes, the blue color in the panel gradually faded until it again assumed a colorless condition. The above cycle was repeated numerous times with no observable difference being noted in the color development in the panel.

While the inventive concept is specifically described in the foregoing specification and the accompanying drawing, it is understood that numerous modifications and variations with respect to form, size, arrangement of parts and operation of mechanical details may be made without departing from the spirit or scope of the invention.

What is claimed is:

1. An electrochromic light filter panel defined by a multi-layer glass panel incorporating therein a color-reversible light filter system which includes:
  (A) a colorless electrode defined by a substantially transparent glass pane having a relatively thin coating of:
    (1) tin oxide; and
    (2) a solid film of silver chloride containing a trace amount of free silver, wherein the silver chloride film is reversibly oxidizable and reducible and is colorless in both the oxidizable state and the reducible state;
  (B) a color-reversible electrode defined by a substantially transparent glass pane having a relatively thin coating of:
    (1) tin oxide; and
    (2) a solid film of an inorganic acid selected from the group consisting of tungstic acid and a mixture of tungstic acid and molybdic acid, wherein the acid film is reversibly oxidizable and reducible, and wherein the acid film will assume a colorless condition in the oxidizable state and will develop a color in the reducible state; and wherein
    (3) the color-reversible pane is in juxtaposition to the colorless pane;
  (C) a power system for supplying a source of direct current to the filter panel, wherein:
    (1) the colorless electrode is connected to a positive terminal of the power system;
    (2) the color-reversible electrode is connected to a negative terminal of the power system; and whereby
    (3) upon passing current through the filter panel the colorless electrode remains colorless and the color-reversible electrode develops a color therein, and whereby upon reversing the polarity of the current the color-reversible electrode will assume a colorless condition.

2. The light filter panel of claim 1 in which the solid acid film comprises a mixture of about 15% by weight tungstic acid and 85% by weight molybdic acid.

3. The light filter panel of claim 1 in which the solid acid film comprises a mixture of about 50% by weight tungstic acid and 50% by weight molybdic acid.

4. The light filter panel of claim 1 in which the potential of the direct current applied to each of the electrodes is from about 3 to 10 volts and the amperage is from about 1 to 50 milliamperes.

References Cited

UNITED STATES PATENTS

| | | | |
|---|---|---|---|
| 3,451,741 | 6/1969 | Manos | 350—160 |
| 3,453,038 | 7/1969 | Kissa et al. | 350—160 |

RONALD L. WIBERT, Primary Examiner

P. K. GODWIN, Assistant Examiner

U.S. Cl. X.R.

252—300